DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 22, 1971

887 O.G. 1047

T887,025

AQUEOUS COATING COMPOSITIONS AND WATER-INSOLUBLE COATINGS PRODUCED THEREFROM

Jack W. Lowe, 520 Rambling Road 37663, and James M. Hawkins, 2104 E. Sevien 37664, both of Kingsport, Tenn., and Larry G. Curtis, 3606 Cimarron Drive, Johnson City, Tenn. 37601

Filed May 28, 1970, Ser. No. 41,579

**Int. Cl. C08g *37/34***

U.S. Cl. 260—29.4OA

No Drawing. 16 Pages Specification

Coating compositions containing (A) a cross-linkable, water-dispersible, oil-free alkyd resin and (B) a water-dispersible amino resin such as urea-formaldehyde and melamine-formaldehyde, both of said resin components being dispersed in an aqueous medium to form a dispersion which can be applied to produce water insoluble, tough, flexible coatings on a variety of surfaces such as those of metal, wood, fabric and the like. The water-dispersible alkyd resin is prepared by reacting a polyol with a dibasic acid, a portion of which acid is dimethylsodium-sulfoisophthalic acid. The resulting resin will have hydroxyl groups along the polymer chain which contribute cross-linkability with an amino resin and is further characterized by having ionic groups derived from the dimethylsodiumsulfoisophthalic acid component also distributed along the polymer chain. The two resin components are dispersed in an aqueous medium to form a sprayable composition which, when applied to surfaces to be protected and thereafter heat-treated, produce tough, flexible, water-insoluble coatings by cross-linking of the two components.